Oct. 22, 1968

J. A. ARMSTRONG 3,407,296

X-RAY HOLOGRAPHIC MICROSCOPE HAVING THREE DIFFRACTING
CRYSTALS DISPOSED IN PARALLEL ALONG
THE X-RAY BEAM PATH

Filed May 16, 1966

INVENTOR.
JOHN A. ARMSTRONG

BY

ATTORNEY

3,407,296
X-RAY HOLOGRAPHIC MICROSCOPE HAVING THREE DIFFRACTING CRYSTALS DISPOSED IN PARALLEL ALONG THE X-RAY BEAM PATH

John A. Armstrong, South Salem, N.Y., assignor to International Business Machines Corporation, Armonk, N.Y., a corporation of New York
Filed May 16, 1966, Ser. No. 550,482
9 Claims. (Cl. 250—51.5)

This invention relates to the field of X-ray microscopy and, more particularly, to a system for extending the resolution of X-ray microscopes.

Present X-ray microscopes have a resolving power of about 2000 A.; that is, the smallest linear separation which two neighboring small objects can have and be seen as two distinguishable objects in the microscope is 2000 A. The invention to be described hereinafter extends the resolution from that present limit to the region of 100 to 200 A., a ten-to-twenty fold increase in resolving power. The overall scheme for obtaining the improved resolution relies on two physical discoveries, namely, holography and the Borrmann effect.

Holography is the science of producing images of objects by wave front reconstruction. In general, no lenses need be involved in such image production and reconstruction. The wavefronts which are recorded photographically and later reconstructed are those due to diffration of electromagnetic radiation by such objects. Relatively detailed descriptions of the science of holography appear in published articles by D. Gabor in the "Proc. Royal Soc." (London), 1949, vol. 197A, pp. 454+, by E. N. Leith and J. Upatnieks in the "Journal of the Optical Society of America" in 1962, vol. 52, pp. 1123+ and on pp. 171–178 of the 1965 issue of the "IBM Journal of Research and Development," vol 9, No. 3.

In the Borrmann effect, there is an anomalous transmission of X-rays through a perfect single crystal whose opposite faces are parallel. When an X-ray beam is incident on such a crystal at an angle other than the Bragg angle, such beam suffers absorption, depending upon the thickness of the crystal and its composition. However, when the X-ray beam enters one parallel face at the Bragg angle, and when all the atoms of the crystal lie on the planes responsible for the Bragg reflection, one observes two beams leaving the opposite parallel face. One beam is diffracted into the forward direction and the other beam is diffracted downwardly at twice the Bragg angle with respect to the forward direction. Moreover, the transmitted beam that suffers both diffractions has an anomalously low absorption if the crystal is substantially free of dislocations. Such a dislocation-free crystal is called a perfect crystal. A discussion of the Borrmann effect appears on pp. 681–683 in the July 1964 issue of "Reviews of Modern Physics," vol. 36, No. 3.

The overall technique for obtaining the improved resolving power of an X-ray microscope involves a two step process. Step I involves the construction of an X-ray hologram of the object being magnified, and Step II involves the reconstruction of this hologram by electromagnetic radiation whose wavelength is $\gg$ than X-rays. The hologram is produced by sending a coherent beam of X-rays through the object, whose X-ray diffraction pattern is then superposed on a reference or carrier X-ray wave with which it interferes. The carrier wave has plane wavefronts and is derived from the source that illuminates the object producing the diffraction pattern. A main feature of the invention comprises a means of making this interference pattern recordable.

Although there have been proposals, prior to this invention, for obtaining X-ray holographic microscopy, such proposed schemes were not usually feasible because: (a) one could not produce two spatially coherent X-ray beams of sufficient intensity; and (b) the modulated interference pattern that resulted from the recombination of the diffracted beam from the object with the carrier wave involved spatial frequencies which could not be recorded on the highest resolution film available. The present invention uses the Borrmann effect to overcome (a) and the X-ray moiré effect in a perfect crystal to overcome the shortcomings set out in (b).

In a preferred embodiment of the invention, an X-ray beam is incident onto one face of a perfect crystal, exiting as two diverging beams of X-rays from a parallel face of said perfect crystal. A second part or section of the perfect crystal intercepts such two divergent beams, causing each intercepted beam to exit from the second crystal section as two divergent beams. Thus, the exiting beams from the second crystal section are four in number, two diverging and two converging towards each other. The object to be enlarged is placed in one of the converging beams and diffracts that beam. The diffracted and undiffracted converging beams merge and interfere at the front surface of a third crystal, or third crystal section. The interference pattern is amplitude and phase modulated by the diffraction from the object and, normally, a hologram would be made by recording the thus modulated pattern.

However, such X-ray interference pattern involves spatial frequencies far too high to be resolvable by known photographic emulsions or films. The third crystal section of the initially grown crystal is stressed, heated, or otherwise energized to alter the spacing of the lattice planes of such third crystal section, the resultant spacing being slightly different from the spacing between the fringes of the interference pattern. As a result a moiré pattern, or difference frequency pattern, appears in the X-ray beam which exists from the third crystal section; this moiré pattern is modulated by the diffraction pattern of the object. These lower spatial frequencies (of the modulated moiré pattern) are resolvable by available film or photographic emulsions, and a film placed adjacent such exiting interference pattern will record a frequency shifted hologram of the object placed in the path of the converging X-ray beam noted hereinabove. Such a hologram can then be reproduced in a conventional manner.

It is an object of this invention to provide a novel X-ray microscope.

It is yet another object to extend the resolution of an X-ray microscope.

It is a further object to obtain an X-ray microscope employing the principles of holography.

It is still another object to employ a pure crystal as a frequency converter of an X-ray interference pattern. The foregoing and other objects, features and advantages of the invention will be apparent from the following more particular description of preferred embodiments of the invention, as illustrated in the accompanying drawings.

Figure 1:
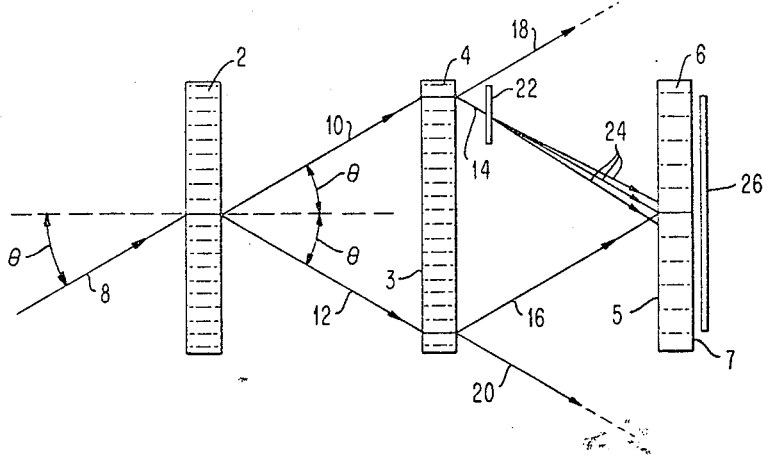
FIG. 1 is a schematic representation of the invention.

In the practice of the invention, three prefect crystals 2, 4, and 6 are employed as elements of the X-ray microscope, the crystal planes in the first two parts being in perfect registration. Examples of crystals that can be used in the practice of the invention are silicon or germanium. Such crystals are chosen because they can be obtained dislocation-free and have structures such that all the atoms lie in suitable families of planes.

An X-ray beam, 8, preferably though not necessarily monochromatic, impinges on crystal 2 at the Bragg angle $\theta$. In accordance with the finding of Borrmann, such beam 8 suffers two diffractions, one is a forward diffraction as indicated by beam 10 and the other is a downward diffraction as represented by beam 12. Both diffracted beams 10 and 12 are monochromatic and leave crystal 2 at plus and minus the Bragg angle $\theta$ with respect to the reflecting planes of the crystal. Borrmann also noted that the attenuation of X-ray beam 8 through crystal 2 is a minimum when such beam enters the perfect crystal 2 at the Bragg angle.

The spacings between crystals 2 and 4 are such that beams 10 and 12 will impinge on the face 3 of crystal 4 and be diffracted as was the initial beam 8. The beams 14 and 16 that converge toward crystal 6 are utilized in carrying out the function of an X-ray microscope, whereas the divergent beams 18 and 20 are allowed to leave the microscope area and be dissipated by suitable absorbing material, not shown.

The object 22 to be magnified is placed in the path of one of the two beams 14 or 16, beam path 14 being selected merely to illustrate the operation of the invention, and such object diffracts beam 14. The diffracted beam 24 and undiffracted beam 16 merge and interfere at the front surface 5 of crystal 6. The interference pattern is amplitude and phase modulated by the diffraction from object 22. Normally, a hologram would be made by recording this modulated interference pattern on a film 26 placed at surface 5. However, the period of this X-ray interference pattern is so small, that available films cannot resolve the pattern. In order to record a hologram of an X-ray interference pattern having such small periods, the crystal 6 is interposed between the merged beams 16 and 24 and film 26. Crystal 6 acts on the interference pattern to shift it to lower spatial frequencies while retaining the information about the object 22 present in the modulation of the interference pattern. Such lower spatial frequencies are readily recordable on presently available film. How the crystal 6 accomplishes such frequency conversion can be better understood by a consideration of FIGS. 2 and 5.

In the description to follow, the term single crystal will include at least two cases, namely, case I where the entire X-ray diffracting unit is cut or otherwise shaped from a single piece of the perfect crystal. In case II, a plurality of perfect crystals are placed in the proper relationship to another to obtain the desired diffracting properties. Consequently, even though the subsequent description might be restricted to one form, merely to simplify the description of the invention, other forms of crystal configurations are not precluded.

Figure 2:
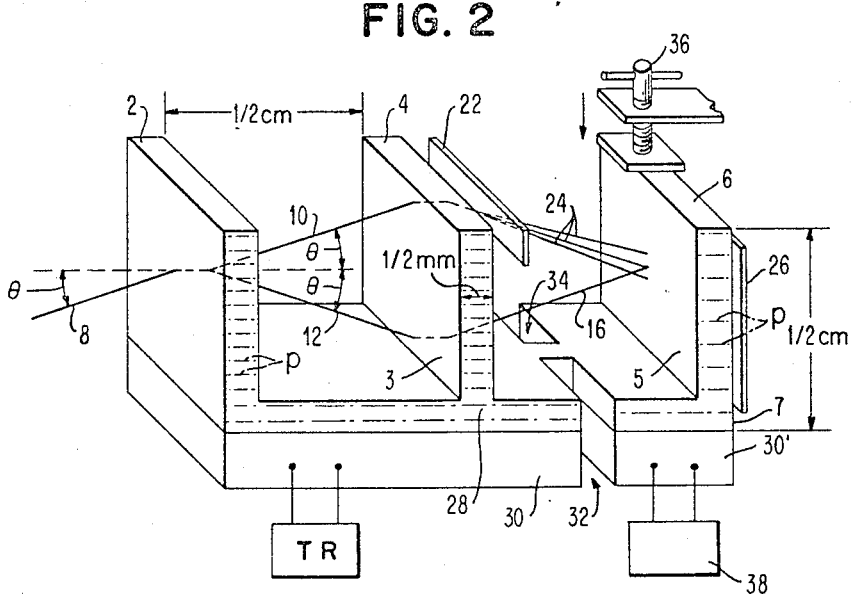
FIG. 2 is an embodiment of the X-ray holographic microscope operating in accordance with the inventive principles on which such microscope is based.

In one embodiment of the invention, parallel crystals 2, 4, and 6 are originally grown as a single pure crystal of silicon or germanium, or the like. By use of saws after the growth of such single crystal, the latter is cut and etched and remains, as shown in FIG. 2, in one piece. Exemplary though not limiting dimensions would be ½ cm. for the height of each crystal, ½ cm. between crystals 2 and 4 and between 4 and 6 and each crystal would be ½ mm. wide. The three crystal elements 2, 4 and 6 are contiguous with a common base 28, crystals 2 and 4 resting in intimate contact with a heat sink 30 made of copper or any other material having high heat conductivity, and crystal 6 rests in intimate contact with another heat sink 30'. Slots 32 and 34 are provided so as to thermally isolate crystal 6 from crystals 2 and 4. Crystal 6 is subjected to energy, either in the form of an axial stress by screw 36, or by changing the temperature of heat sink 30', via energy source 38, so that crystal 6 takes on a temperature differernt from crystals 2 and 4.

The crystal 6 operates as an analyzer in the following manner. If the spacing of the lattice planes $p$ in crystal 6 is the same as in the spacing between the fringes of the interference pattern that was produced at surface 5 of crystal 6, the X-ray beams 16 and 24 can pass through crystal 6 the way beams 8, 10, and 12 passed through their respective crystals, namely, via the Borrmann effect. The pattern formed at the surface 5 in the absence of a diffracting object 22 is one of straight fringes. If the lattice separation in crystal 6 is different from such fringe separation, the transmitted field at the surface 7 will exhibit moiré fringes whose spatial frequency is the difference between the spatial frequencies of the lattice pattern and the fringe pattern. Since the moiré pattern will be at a low spatial frequency to be resolvable by films capable of resolving about $$\frac{1000 \text{ line pairs}}{\text{mm.}}$$

a film 26 can be employed to record such fringes. In the presence of an object 22, the diffraction pattern which modulates the original X-ray interference pattern at surface 5 also modulates the X-ray moiré pattern formed at the surface 7 of crystal 6; such modulated moiré pattern can be photographed, producing a hologram which can be reconstructed by conventional coherent visible light, namely, a laser beam. During reconstruction using radiation of a wavelength greater than the X-ray wavelength, the image of the original object will be magnified by the ratio of one reconstruction wavelength to the X-ray wavelength. Such magnification can easily be a factor of a 1000.

In order to make the lattice spacing of crystal 6 different from the lattice spacing of crystals 2 and 4, the temperature of heat bath 30' is changed so that the temperature of crystal 6 is different from that of crystals 2 and 4. Slots 32 and 34 permit thermal isolation between crystal 6 and crystals 2 and 4. If desired, thermal regulating means TR can be applied to element 30 so as to maintain crystals 2 and 4 at a constant temperature $T_1$, whereas heat is applied to change the temperature of crystal 6 to $T_2$, such change in temperature producing the desired alteration in the lattice spacing of crystal 6.

Figure 5:
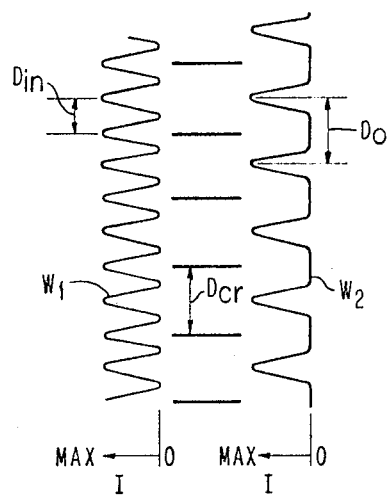
FIG. 5 is a representation of a waveform pattern entering the left side of the rightmose crystal of FIG. 1 and leaving the right side of the such crystal.

Assume, as seen in FIG. 5, that the X-ray interference pattern that appears on the surface 5 of crystal 6 is represented by waveform $W_1$ and that $D_{in}$ is the fringe separation of that X-ray interference pattern. Let $D_{cr}$ be the lattice spacing between adjacent crystal planes and $D_o$ the fringe spacing in the output interference pattern $W_2$ on surface 7. In this illustrative example, the difference between $D_{in}$ and $D_{cr}$ is greatly exaggerated. In reality, the two will differ by one part in ten thousand.

One can represent the relationship of the spatial frequencies of the interference patterns impinging upon and leaving crystal 6 by the relationship $$f_{out} = f_{in} - f_{cr} \tag{1}$$

where the spatial frequency of the output pattern $W_2$ equals the spatial frequency of the input pattern $W_1$ minus the spatial frequency of the reflecting planes of crystal 6. Equation (1) can be expressed as $$\frac{2\pi}{D_o} = \frac{2\pi}{D_{in}} - \frac{2\pi}{D_{cr}} \tag{2}$$

The lattice spacing $D_{cr}$ of crystal 6 can be expressed as a function of $D_{in}$, wherein $$D_{cr} = D_{in}(1 + \alpha \Delta T) \tag{3}$$

Thus, $D_{cr}$ changes as a function of temperature $T$ and the coefficient of thermal expansion $\alpha$, where $\alpha$, for silicon, is $$\frac{2.5 \times 10^{-6}}{°C}$$

Substituting Equation (3) for its equivalent value in Equation (2) yields $$\frac{2\pi}{D_o} = \frac{2\pi}{D_{in}} - \frac{2\pi}{D_{in}(1 + \alpha \Delta T)} \tag{4}$$

for very small values of the product ($\alpha \Delta T$)

$$\frac{1}{1+\alpha \Delta T} \cong 1 - \alpha \Delta T$$

Consequently, Equation (4) can be written in the following manner.

$$\frac{2\pi}{D_o} = \frac{2\pi}{D_{in}} - \frac{2\pi(1-\alpha \Delta T)}{D_{in}} \qquad (5)$$

$$\frac{2\pi}{D_o} = \frac{2\pi \alpha \Delta T}{D_{in}} = f_{out} \qquad (6)$$

Thus, by varying the temperature of the crystal 6 by an amount $\Delta T$, one can obtain a sufficiently low spatial frequency in the output wave $W_2$ as to be compatible with the resolution capabilities of known film emulsions. Since spatial frequencies of the order of $10^{+4}$/cm. are the highest recordable frequencies for present day films, and $\alpha$ (for silicon) is of the order of $$\frac{2.5 \times 10^{-6}}{°C.}$$

changes of about 40° C. or higher in the crystal 6 will produce sufficient change in the output frequency of input waveform $W_1$ so as to make the latter capable of having its information recorded as a hologram on film.

It is also understood that other pure crystals can be thermally modified as the silicon is in order to produce a hologram. Moreover, axial stresses can be applied to crystal 6 in order to obtain the same effect as that produced by temperature change. A pressure applying screw 36 is an example of such a supplier of uniaxial stress to the crystal 6, although any other way of applying uniaxial stress may be employed.

Figure 3:
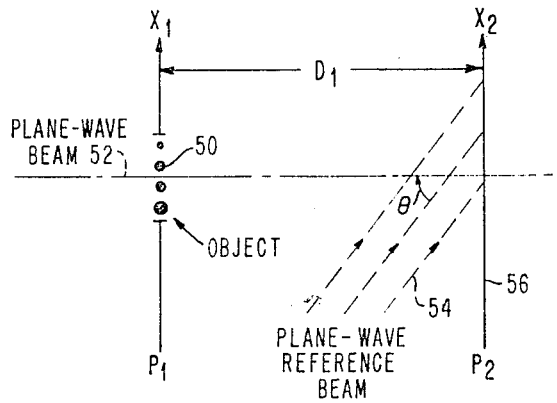
FIGS. 3 and 4 are prior art schemes of how a hologram is produced and reproduced, respectively.
Figure 4:
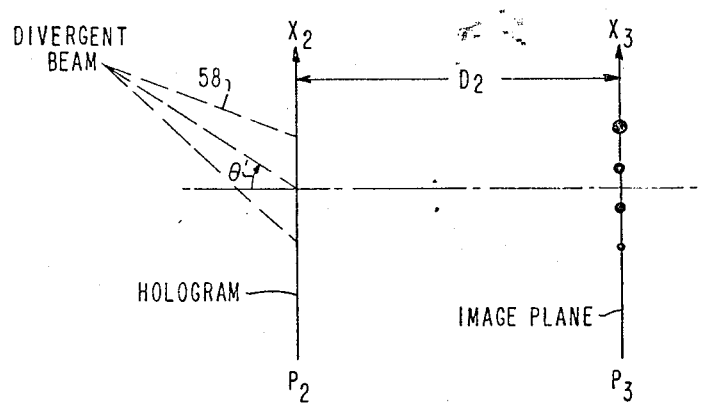

FIGS. 3 and 4 show what is old in the art of holography, but they will be described as aids in understanding the operation of the present invention. In FIG. 3, a hologram is constructed by placing an object 50 in plane $P_1X_1$, such as a transparency, in front of a beam 52 of monochromatic light of wavelength $\lambda_1$; the diffraction field due to object 50 is superposed on a reference or carrier wave 54 with which it interferes. The carrier wave 54 has plane wavefronts and is derived from the same source that illuminates the object 50. The resulting total field is recorded photographically on a film 56 that lies in plane $P_2X_2$. The separation between object 50 and hologram plane $P_2X_2$ is $D_1$.

In reconstruction (see FIG. 4) of the hologram, the developed hologram is illuminated solely by a divergent beam 58 of coherent light (a laser being a suitable source) of wavelength $\lambda_2$, giving rise to a diffraction field containing the real image of object 50 in the plane $P_3X_3$. The angle of reconstruction $\theta'$ is related to the angle of incidence $\theta$ of the reference beam 56 by the relationship $$\sin \theta' = \lambda_2/\lambda_1 \sin \theta$$

$D_2$ being the separation distance of the hologram and the image plane $P_3X_3$. Lateral magnification M of the image equals $D_2\lambda_2/D_1\lambda_1$ in all directions parallel to the plane of the hologram and longitudinal magnification is $$\frac{D_2}{D_1}M$$

in the direction perpendicular to the plane of the hologram.

The brief description of how a hologram is constructed and reconstructed is not intended to serve any purpose other than to introduce the reader to the nature of a hologram when visible light is used. A considerably more detailed treatment of holograms is set out in the aforementioned publication by the inventor that appeared in the May 1965 issue of the IBM Journal of Research and Development. The present invention deviates from the normal way of constructing holograms because X-rays produce interference patterns that are not capable of being recorded by presently available films.

In general, a hologram will consist of a standing wave interference pattern of a certain spatial frequency which has been modulated by the diffraction pattern of the object to be recorded. The spatial frequency of this standing wave that serves as a carrier frequency is, when X-rays are used to create the hologram, much too high to be recorded by films presently available for their resolution capabilities. However, the modulation frequencies in the diffraction pattern are low enough so that they are recordable films. The altering of the lattice spacing of the atomic planes of crystal 6 shifts the carrier frequency and its information side bands to a lower frequency range which can be recorded on the film 26. In effect, crystal 6 operates as the local oscillator in a radio network that shifts the modulated carrier to an I.F. frequency for subsequent processing.

A novel X-ray microscope has been described herein that extends the resolution from the present limit of 2000 A. to a region of 100–200 A. and lower yet its use is compatible with films whose resolving powers are very many times lower than 2000 A. This is accomplished by the relatively simple procedure of using a first crystal as a coherent beam splitter that collimates the X-ray beam to $10^{-4}$ radians or better and a second crystal as a set of mirrors that reflects two coherent beams back towards each other, permitting one to make a hologram of an X-ray interference pattern. The third crystal provides the function of a frequency shifter to shift the carrier and its modulation (containing the information about the object) to a spatial frequency range which can be recorded on film. The holographic reconstruction then proceeds in the manner well known in the art and magnification is obtained because the reconstruction wavelength is greater than the X-ray wavelength used to construct the hologram.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An X-ray microscope comprising a source of X-rays, first means for converting said source into a pair of diverging monochromatic X-ray beams, second means for converting said diverging X-ray beams into a pair of converging X-ray beams that merge to form a standing wave interference pattern of a given spatial frequency, an object to be magnified placed in the path of one of said converging beams so as to produce a diffraction pattern of said object, said diffraction pattern modulating said interference pattern, and means for shifting said interference pattern to lower spatial frequencies while still retaining the information about the object present in the modulation of the interference pattern.

2. The X-ray microscope of claim 1 wherein said means for shifting said interference pattern to lower spatial frequencies comprises a substantially perfect crystal.

3. The X-ray microscope of claim 2 wherein means are provided to alter the lattice spacing of said perfect crystal.

4. The X-ray microscope of claim 3 wherein said means for altering the lattice spacing of said perfect crystal is heat applying means.

5. The X-ray microscope of claim 3 wherein said means for altering the lattice spacing of said crystal is a means for applying uniaxial stress to said crystal.

6. An X-ray microscope comprising a source of X-rays, first means for converting said source into a pair of diverging monochromatic X-ray beams, second means for converting said diverging X-ray beams into a pair of converging X-ray beams that merge to form a standing wave interference pattern of a given spatial frequency, an object to be magnified placed in the path of one of said converging beams so as to produce a diffraction pattern of said object, said diffraction pattern modulating said interference pattern, means for shifting said interference pattern to lower spatial frequencies while still retaining the information about the object present in the modulation of such interference pattern, and means recording said interference pattern having such lower spatial frequencies.

7. In an X-ray microscope comprising a source of X-rays, three substantially perfect crystals parallelly disposed, said source of X-rays impinging at the Bragg angle on the first crystal so as to produce two divergent exiting beams from said first crystal that impinge upon said second crystal, said second crystal producing convergent beams that impinge on said third crystal, and an object to be magnified located in the path of one of said convergent beams.

8. An X-ray microscope comprising a source of X-rays, three substantially perfect crystals parallelly disposed, said source of X-rays impinging at the Bragg angle on the first crystal so as to produce two exiting monochromatic beams from said first crystal that are divergent, said second crystal being located so as to intercept said divergent beams and cause said divergent beams to produce two convergent monochromatic beams, an object to be magnified placed in the path of one of said convergent beams so as to diffract said beam, said diffracted beam and undiffracted beam merging to produce an interference pattern at the front surface of said third crystal, means for altering the lattice spacing of only the third crystal for modifying said interference pattern, and a recording film located at the surface of said third crystal through which said modified interference pattern emerges.

9. An X-ray microscope comprising a source of X-rays, three substantially perfect crystals disposed in parallel relationship to one another, said source of X-rays impinging at the Bragg angle on the first of said crystals so as to produce two divergent exiting X-ray beams from said first crystal that impinge upon the second of said crystal, said second crystal producing convergent beams that impinge on the third of said crystals, an object to be magnified located in the path of one of said convergent beams, said convergent beam merging at said third crystal, means for altering the lattice spacing of said third crystal, and means for recording the interference pattern exiting from said third crystal.

No references cited.

RALPH G. NILSON, *Primary Examiner.*

A. L. BIRCH, *Assistant Examiner.*